(12) United States Patent
Kim et al.

(10) Patent No.: US 9,503,565 B2
(45) Date of Patent: *Nov. 22, 2016

(54) DEVICE AND METHOD FOR PROVIDING APPLICATION FOR EXTERNAL ACCESSORY IN WIRELESS TERMINAL

(71) Applicant: Samsung Electronics Co., Ltd., Gyeonggi-do (KR)

(72) Inventors: Min-Ji Kim, Seoul (KR); Jin Park, Gyeonggi-do (KR); Yong-Soo Jeong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 13 days.

This patent is subject to a terminal disclaimer.

(21) Appl. No.: 14/279,626

(22) Filed: May 16, 2014

(65) Prior Publication Data

US 2014/0256381 A1    Sep. 11, 2014

Related U.S. Application Data

(63) Continuation of application No. 13/360,974, filed on Jan. 30, 2012, now Pat. No. 8,731,614.

(30) Foreign Application Priority Data

Apr. 28, 2011  (KR) .................. 10-2011-0040015

(51) Int. Cl.
*H04B 1/38*   (2015.01)
*H04M 1/725*  (2006.01)
*H04M 1/00*   (2006.01)

(52) U.S. Cl.
CPC ..... *H04M 1/72563* (2013.01); *H04M 1/72527* (2013.01); *H04M 1/7253* (2013.01); *H04M 1/72525* (2013.01); *H04M 1/72583* (2013.01)

(58) Field of Classification Search
CPC .................. H04M 1/72527; G06F 1/1632
USPC .................. 455/556.1–556.2, 567, 566
See application file for complete search history.

(56) References Cited

U.S. PATENT DOCUMENTS 6,718,414 B1   4/2004  Doggett
6,725,061 B1   4/2004  Hutchison, IV et al.
(Continued)

FOREIGN PATENT DOCUMENTS

CN    1354958 A      6/2002
CN    101893935 A    11/2010

OTHER PUBLICATIONS

Chinese Examination Report, dated Mar. 4, 2016.

*Primary Examiner* — Lee Nguyen
(74) *Attorney, Agent, or Firm* — Cha & Reiter, LLC

(57) ABSTRACT

A method and device for providing an application for an external accessory in a wireless terminal, by which related applications corresponding to a type of an external accessory connected to a wireless terminal can be displayed. Instead of sifting through applications or searching for the appropriate ones for the external accessory, the invention causes them to be displayed. To this end, the device includes a display unit for displaying related applications for an external accessory connected to the wireless terminal and a controller for sensing a type of the external accessory connected to the wireless terminal and extracting and displaying related applications for the external accessory.

20 Claims, 4 Drawing Sheets

(56) References Cited

U.S. PATENT DOCUMENTS

| | | |
|---|---|---|
| 8,145,269 B2 | 3/2012 | Shin et al. |
| 8,731,614 B2 * | 5/2014 | Kim et al. .................. 455/557 |
| 2009/0280863 A1 | 11/2009 | Shin et al. |
| 2010/0178873 A1 | 7/2010 | Lee et al. |

* cited by examiner

DEVICE AND METHOD FOR PROVIDING APPLICATION FOR EXTERNAL ACCESSORY IN WIRELESS TERMINAL

CROSS REFERENCE TO RELATED APPLICATIONS

The present application is a Continuation of U.S. patent application Ser. No. 13/360,974 filed on Jan. 30, 2012, which claims the benefit under 35 U.S.C. §119(a) of a Korean Patent Application filed in the Korean Intellectual Property Office on Apr. 28, 2011 and assigned Serial No. 10-2011-0040015, the entire disclosure of which is hereby incorporated by reference in its entirety.

BACKGROUND

1. Technical Field

The present disclosure relates to a method and device for providing an application for an external accessory in a wireless terminal. More particularly, the present disclosure is related to a method and a device for providing an application for an external accessory in a wireless terminal in which related applications can be displayed.

2. Description of the Related Art

With recent developments in electronic engineering and communication engineering, wireless terminals are now equipped with more functions than known heretofore. In other words, as wireless communication and data processing technologies have rapidly developed, users of communication devices such as wireless terminal not only can access voice communication, but can also access other functions such as Internet services, video communication, and moving picture message transmission, through such wireless terminals.

With the widespread popularity of wireless terminals, a larger amount of communication occurs wirelessly than ever known. In this regard, wireless terminals have been recognized as becoming an indispensable communication means for the modern life.

In line with the development of wireless terminals, the development of services provided through the wireless terminals and applications processed in the wireless terminals are also increasing and becoming more diversified.

At present, once an application is downloaded in a wireless terminal, the downloaded application is stored and displayed on a menu screen in an order in which it is downloaded. This order may not be reflective of a frequency of usage.

A user of the wireless terminal selects a frequently-used application from among a plurality of applications currently displayed on the menu screen, and moves the selected application to a corresponding one of a plurality of home screens of the wireless terminal to display the application on the home screen.

In addition, to the wireless terminal may be connected to various external accessories, e.g., a vehicle cradle, a keyboard, or the like.

However, to use an application available according to a type of an external accessory connected to the wireless terminal, the wireless terminal's user has to inconveniently search for the application available according to the type of the connected external accessory on a menu screen or a plurality of home screens where a plurality of applications are displayed.

SUMMARY

Accordingly, an exemplary aspect of the present invention is to provide a device and method that permits access to an application for an external accessory in a wireless terminal in a far less-cumbersome manner than known heretofore, by which related applications corresponding to a type of an external accessory connected to a wireless terminal can be displayed without having to sift through the plurality of non-relevant applications. The access to the application may be direct access. The relevant applications, which are also referred to as "related applications" are suited to the particular external accessory, meaning if there are applications that are non-operable in conjunction with the external accessory, they will not be displayed.

Another exemplary aspect of the present invention is to provide a device and method that permits access to an application for an external accessory in a wireless terminal, by which the wireless terminal can be connected to the external accessory through wired communication, wireless communication, or augmented reality.

Yet another exemplary aspect of the present invention is to provide a device and method that permits access to an application for an external accessory in a wireless terminal, by which related applications for an external accessory connected to the wireless terminal may be arranged and displayed according to their priorities.

A further exemplary aspect of the present invention is to provide a device and method that permits access to an application for an external accessory in a wireless terminal, by which a home screen can be displayed from among a plurality of home screens of the wireless terminal, on which related applications for an external accessory connected to the wireless terminal are arranged according to their priorities.

Another exemplary aspect of the present invention is to provide a device and method that permits access to an application for an external accessory in a wireless terminal, by which an environment of the wireless terminal can be automatically reset according to a type of an external accessory connected to the wireless terminal According to an exemplary aspect of the present invention, there is provided a device that permits access to an application for an external accessory in a wireless terminal, the device including a display unit for displaying related-applications for an external accessory connected to the wireless terminal and a controller for sensing a particular type of the external accessory connected to the wireless terminal and extracting and displaying related-applications for the external accessory.

According to even another exemplary aspect of the present invention, there is provided a method that permits to an application for an external accessory in a wireless terminal, the method including if an external accessory is connected to the wireless terminal, sensing a type of the external accessory connected to the wireless terminal, and if the type of the external accessory is sensed, extracting and displaying related applications for the external accessory.

BRIEF DESCRIPTION OF THE DRAWINGS

The above and other features and advantages of an exemplary embodiment of the present invention will become more apparent to a person of ordinary skill in the art from the following detailed description taken in conjunction with the accompanying drawings, in which.

DETAILED DESCRIPTION

Hereinafter, an exemplary embodiment of the present invention will be described in detail with reference to the accompanying drawings. It should be noted that like symbols indicate like components throughout the drawings.

Figure 1:
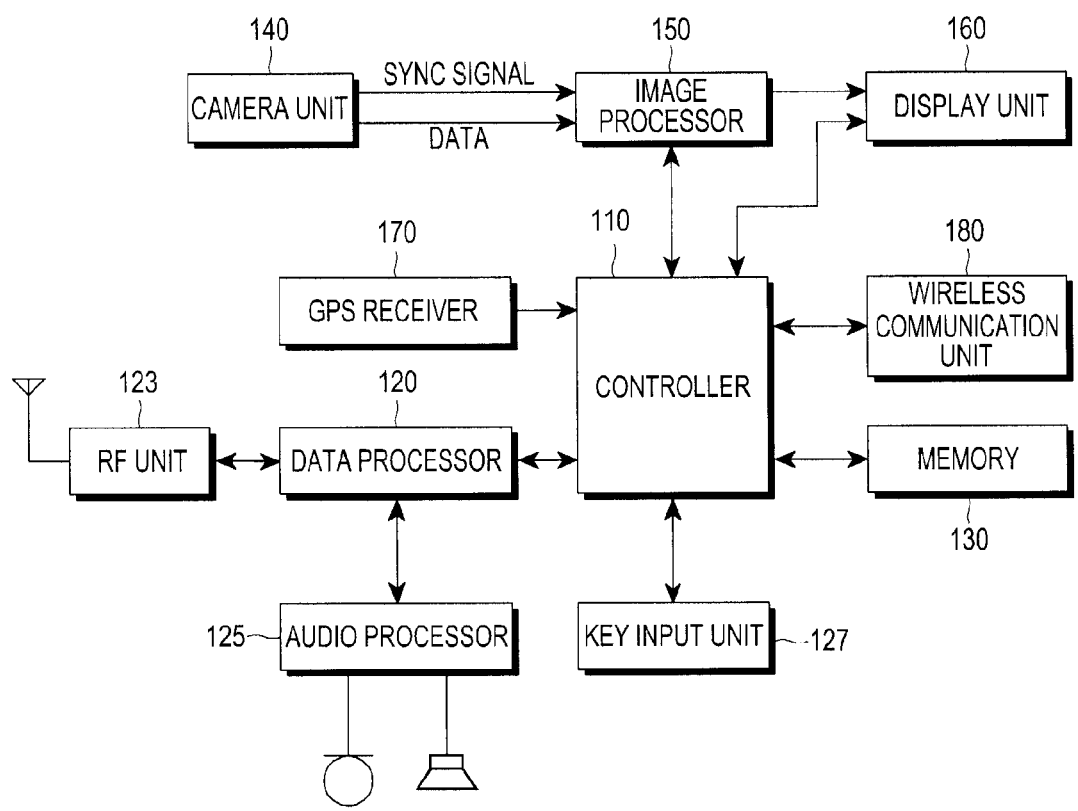
FIG. 1 is a block diagram of a wireless terminal according to an exemplary embodiment of the present invention.

FIG. 1 is a block diagram of a wireless terminal according to an exemplary embodiment of the present invention.

Referring now to FIG. 1, a Radio Frequency (RF) unit 123 preferably performs a wireless communication function of the wireless terminal. The RF unit 123 preferably includes an RF transmitter for up-converting a frequency of a transmission signal and amplifying the transmitted signal and an RF receiver for low-noise amplifying a received signal and down-converting the frequency of the received signal. The RF Unit may, of course, include a transceiver. A data processor 120 includes a transmitter for encoding and modulating the transmission signal and a receiver for demodulating and decoding the received signal. In other words, the data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 preferably includes keys for inputting numeric and character information and function keys for setting various functions.

A memory 130, which is a non-transitory machine readable medium, includes program and data memories. The program memory stores programs for controlling a general operation of the wireless terminal and a program for automatically displaying related applications corresponding to a type of an external accessory connected to the wireless terminal.

According to an exemplary embodiment of the present invention, the memory 130 also stores a mapping table where each external accessory type and related applications corresponding thereto are stored. The related applications are stored according to their priorities. The priorities can be a default and/or user-set.

The related applications corresponding to each external accessory type stored in the mapping table and the priorities of the related applications may be set manually by user's setting, or automatically according to a type of an application used in connection of an external accessory to the wireless terminal and the frequency of use of the application or applications.

Metadata of a related application may include information about a corresponding external accessory type and information about a priority of the related application.

A controller 110 controls overall operation of the wireless terminal.

According to an exemplary embodiment of the present invention, once an external accessory is connected to the wireless terminal, the controller 110 extracts related applications corresponding to a type of the connected external accessory and displays the extracted related applications on a display unit 160.

According to another exemplary embodiment of the present invention, the controller 110 senses a type of an external accessory connected to the wireless terminal through wired communication, and extracts and displays related applications corresponding to the sensed type of the external accessory.

According to another exemplary embodiment of the present invention, the controller 110 searches for types of (connectable) external accessories in the vicinity of the wireless terminal through wireless communication (typically through wireless communication unit 180), displays the found types of the external accessories adapted for coupling therewith, and couples any selected by the user from among the found external accessories to the wireless terminal.

According to an exemplary embodiment of the present invention, the controller 110 searches for types of connectable external accessories in the vicinity of the wireless terminal in an augmented reality search mode, displays the found types of the connectable external accessories on an augmented reality screen, and connects any type selected by the user from among the found external accessories to the wireless terminal.

According to yet another exemplary embodiment of the present invention, the controller 110 previously sets (i.e. pre-sets) a related application for an external accessory by storing an external accessory type corresponding to the related application and a priority of the related application through the mapping table stored in the memory 130 according to user's manual setting. Information about the external accessory type corresponding to the related application and information about the priority of the related application may be included in the metadata of the related application.

According to an exemplary embodiment of the present invention, the controller 110 stores an application used during connection of an external accessory to the wireless terminal as a related application for the external accessory and stores a priority of the related application according to the frequency of use of the related application for the external accessory, through the mapping table stored in the memory 130, by pre-setting the related application for the external accessory. Information about the external accessory type corresponding to the related application and information about the priority of the related application may be included in the metadata of the related application According to another exemplary embodiment of the present invention, the controller 110 may arrange and display the extracted related applications for the external accessory according to priorities previously set (i.e. pre-set priorities) of the related applications. In this case, the related applications may be displayed on a home screen which is set by default from among a plurality of home screens of the wireless terminal.

According to another exemplary embodiment of the present invention, the controller 110 may map each of the plurality of home screens of the wireless terminal to a home screen corresponding to an external accessory type to display related applications for the external accessory on the corresponding home screen.

Thus, the controller 110, by displaying a home screen corresponding to the type of the external accessory connected to the wireless terminal from among the plurality of home screens of the wireless terminal on the display unit 160, may arrange and display the extracted related applications for the external accessory on the home screen according to previously set (i.e. pre-set) priorities of the related applications.

According to another exemplary embodiment of the present invention, the controller 110 may perform edit functions such as deleting or adding an application during display of the related applications corresponding to the type of the connected accessory on the display unit 160.

According to another exemplary embodiment of the present invention, the controller 110 automatically resets an environment of the wireless terminal according to the type of the external accessory connected to the wireless terminal. For example, an environment of the wireless terminal may be automatically reset, such that if the wireless terminal is connected to a vehicle cradle, a volume may be automatically adjusted to a predetermined value or less, or if the wireless terminal is connected to a media external accessory, a volume may be adjusted to a predetermined value or more or a manner mode may be switched to a ring mode. A type of the environment of the wireless terminal corresponding to the external accessory type may be changed by user's selection.

According to another exemplary embodiment of the present invention, the controller 110 may provide home screens on which related applications corresponding to an external accessory type are displayed, according to user's selection, regardless of connection of an external accessory.

According to another exemplary embodiment of the present invention, when related applications for an external accessory connected to the wireless terminal on a corresponding home screen of the display unit 160, the controller 110 may display related information for the displayed applications on a particular region of the home screen. For example, when a vehicle cradle is connected to the wireless terminal, related information "in the car" may be displayed on a particular region of a home screen on which related applications are displayed. The particular region can be user-designated with an automatic default.

With continued reference to FIG. 1, a camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor comprises a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one integrated unit or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 preferably includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. Other types of thin film technology displays and hybrids thereof may be used, including but not limited to Light-emitting diode (LED), organic light-emitting diode (OLED), active-matrix organic light-emitting diode (AMOLED), super-AMOLED etc. When the LCD is implemented with a touch screen, it may serve as an input unit. In this case, on the display unit 160, keys such as the key input unit 127 may be displayed.

The display unit 160 preferably displays related applications for an external accessory connected to the wireless terminal according to an embodiment of the present invention.

A Global Positioning System (GPS) receiver 170 receives information about a current location of the wireless terminal An artisan should understand and appreciate that a system other than GPS may also be used with the presently claimed invention.

The wireless communication unit 180 performs communication with a connectable external accessory in the vicinity of the wireless terminal according to an exemplary embodiment of the present invention.

Figure 2:
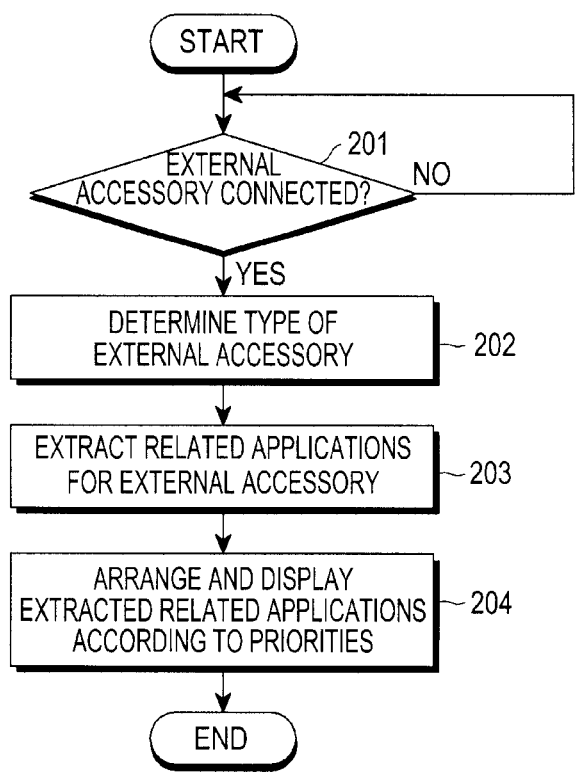
FIG. 2 is a flowchart illustrating an exemplary process of automatically displaying a related application corresponding to a type of an external accessory in a wireless terminal according to an exemplary embodiment of the present invention.
Figure 3A:
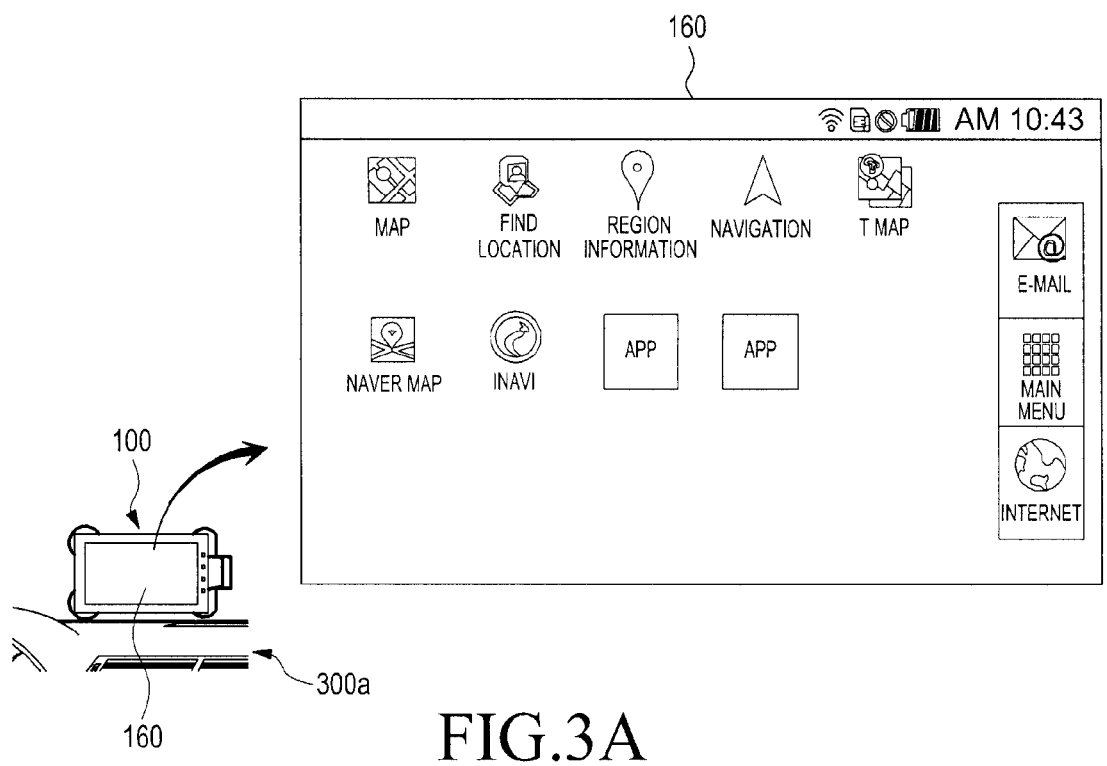
FIG. 3A, FIG. 3B, and FIG. 3C are diagrams illustrating an operation of automatically displaying a related application corresponding to a type of an external accessory in a wireless terminal according to an exemplary embodiment of the present invention.
Figure 3B:
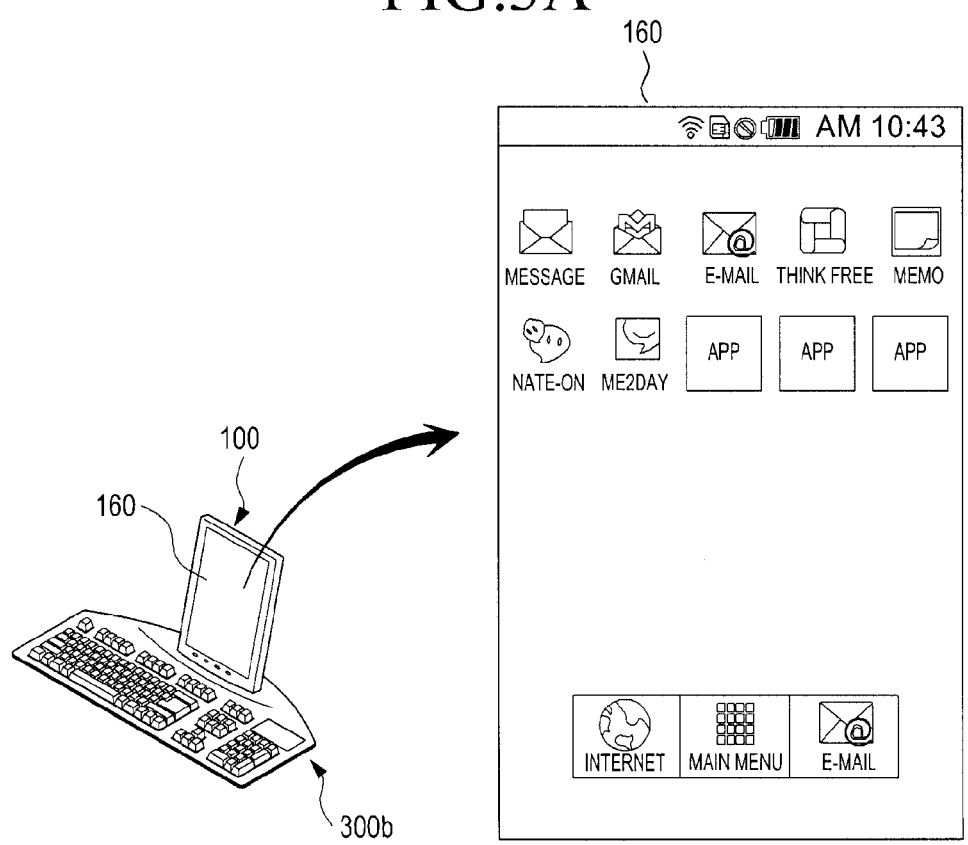
Figure 3C:
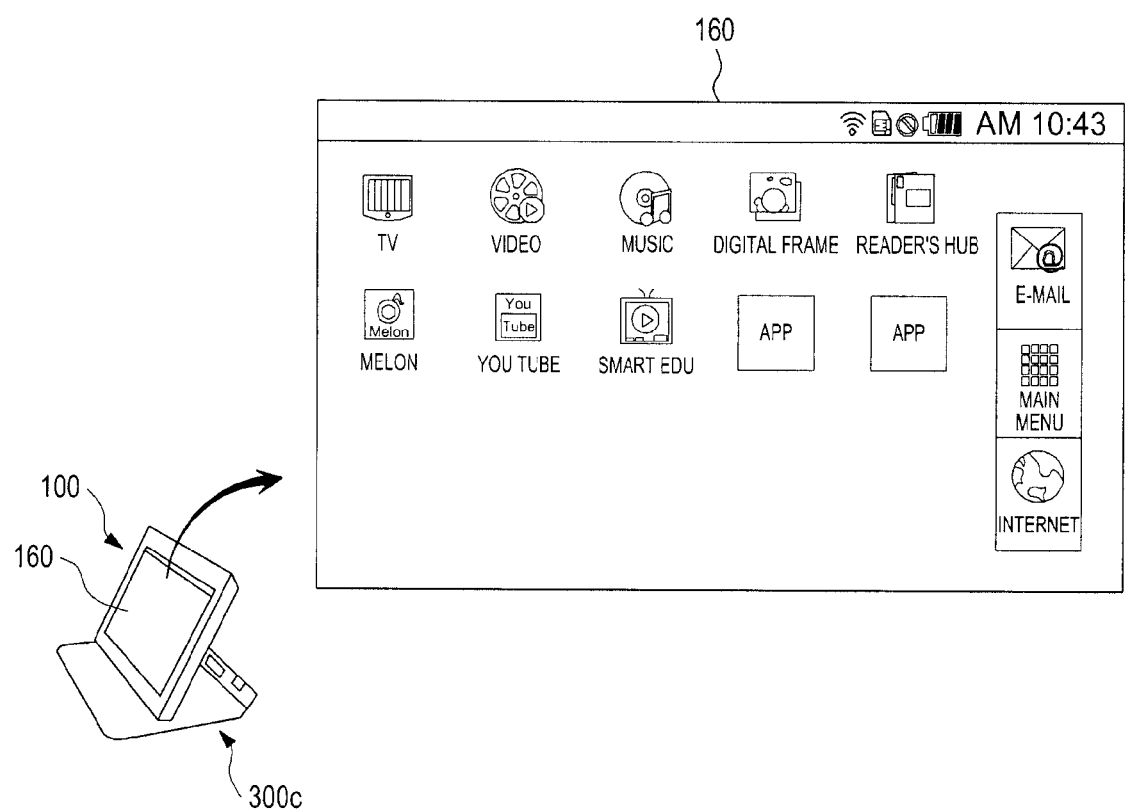

With reference to FIGS. 2 through 3C, a detailed description will be made of an operation of providing a related application corresponding to an external accessory type in a wireless terminal.

FIG. 2 is a flowchart illustrating an exemplary process of automatically displaying a related application corresponding to external accessory type in a wireless terminal, according to an exemplary embodiment of the present invention.

The exemplary embodiment of the present invention will now be described in detail with reference to FIGS. 2 through 3C, in conjunction with FIG. 1.

Referring now to FIG. 2, when an external accessory is connected to the wireless terminal, the controller 110 senses the connection in step 201, and determines a type of the external accessory connected to the wireless terminal in step 202.

The external accessory may be connected to the wireless terminal through wired communication, wireless communication, or augmented reality.

In the case where the connection is through wireless communication, the controller 110 searches for the types of connectable external accessories in the vicinity of the wireless terminal, displays the found types of connectable external accessories on the display unit 160, and automatically connects the wireless terminal to an external accessory selected by a user from among the displayed external accessories through wireless communication. The external accessory preferably includes a wireless communication unit for wireless communication.

The external accessories displayed on the display unit 160 may also be displayed together with images indicating the external accessories and related information of the external accessories.

In the case of augmented reality, during an augmented reality search mode selected by the user, the controller 110 transmits current location information of the wireless terminal to a particular server, which is received through the GPS receiver 170, and the particular server stores a location and information of an external accessory. Upon receiving types of external accessories located in the vicinity of the wireless terminal and related information of the external accessories from the particular server, the controller 110 displays the external accessory types and the related information on an augmented reality screen, and automatically connects the wireless terminal to an external accessory selected by a user from among the displayed external accessories through wireless communication. The external accessory includes a wireless communication unit for wireless communication.

The external accessories displayed on the augmented reality screen of the display unit 160 may be displayed as images indicating the external accessories.

At step 203, once the type of the connected external accessory is determined, the controller 110 extracts related applications for the external accessory through a mapping table stored in the memory 130.

The mapping table stores external accessory types and related applications corresponding thereto, in which the related applications are stored according to their priorities. While it is preferred to use a mapped table, an artisan should understand and appreciate that the claimed invention can function with other ways to store and retrieve the information.

The external accessory types and the related applications corresponding to the external accessory types stored in the mapping table may be set manually by user's setting, or automatically according to a type of an application used in connection of an external accessory to the wireless terminal and the frequency of use of the application.

At step 204, the controller 110 arranges the related applications extracted in step 203 according to the priorities of the applications and displays them on the display unit 160.

In step 204, the controller 110 may arrange and display the related applications according to the priorities of the applications on a default home screen among a plurality of home screens.

The controller 110 maps each of the plurality of home screens of the wireless terminal to a home screen corresponding to an external accessory type to separately display related applications for the external accessory on the corresponding home screen. Thus, by displaying the home screen mapped to the external accessory among the plurality of home screens in step 204, the controller 110 may arrange and display the related applications according to the priorities of the applications on the home screen.

In addition, at step 204 the controller 110 may delete an application selected by the user from among the displayed related applications or add an application selected on a menu screen or another home screen to the related applications for the external accessory.

Moreover, at step 204, the controller 110 may display related information for the displayed applications on a particular region of the home screen where the related applications are displayed. For example, when a vehicle cradle is connected to the wireless terminal, a title related information "using in the car" may be displayed on a particular region of a home screen; when a keyboard is connected to the wireless terminal, a title related information "using keyboard" may be displayed on a particular region of a home screen.

When an external accessory is connected to the wireless terminal, the controller 110 may automatically reset an environment of the wireless terminal according to a type of the connected external accessory. For example, when a media cradle is connected to the wireless terminal, an environment of the wireless terminal may be automatically reset such that a volume in the wireless terminal is adjusted to a predetermined value or more, a manner mode is switched to a ring mode, and the use of a battery is activated.

When there is no connection of an external accessory to the wireless terminal, the controller 110 displays a type of an external accessory through user's selection of a particular menu, and displays related information, latest use information, and related applications of the external accessory selected by the user.

If there is no related application in the wireless terminal when an external accessory is connected to the wireless terminal, the controller 110 may sense the absence thereof and display applications, which are not registered as related applications among applications of the wireless terminal, or request download of a related application FIGS. 3A and 3B are exemplary screen illustrations of an operation of automatically displaying a related application corresponding to an external accessory type in a wireless terminal according to an exemplary embodiment of the present invention.

As shown in FIG. 3A, when a vehicle cradle 300*a* is coupled to a wireless terminal 100, on the display unit 160 of the wireless terminal 100 may be displayed a home screen on which related applications, which are available through connection of the vehicle cradle 300*a*, are arranged according to their priorities. The related applications may be applications, such as a navigation application, a map application, a traffic condition application, and so forth, which are frequently used when the wireless terminal 100 is coupled to the vehicle cradle 300*a*.

When the vehicle cradle 300*a* is connected to the wireless terminal 100, an environment (i.e. external indications) of the wireless terminal 100 is reset according to the connected vehicle cradle 300*a*. For example, a ring mode may be switched to a vibration mode, or a volume of a ring tone may be reduced to a predetermined value or less, and a type of the environment reset in the wireless terminal 100 may be changed by user's selection.

As shown in FIG. 3B, when a keyboard 300*b* is coupled to the wireless terminal 100, on the display unit 160 of the wireless terminal 100 may be displayed a home screen on which related-applications, which are available through coupling of the keyboard 300*b* to the wireless terminal, and are arranged according to their priorities.

For example, when the keyboard 300*b* is connected to the wireless terminal 100, an environment of the wireless terminal 100 is reset according to the connected keyboard 300*b*, and a type of the environment reset (i.e. external indications reset) in the wireless terminal 100 may be changed by user's selection.

A person of ordinary skill in the art should understand and appreciate the terminology regarding an environment of the wireless terminal being reset includes items such as ring mode, volume change, display brightness, and/or a small-capacity battery being activated for use with a particular type of device comprising the external accessory.

As shown in FIG. 3C, when a media player 300*c* is connected to the wireless terminal 100, on the display unit 160 of the wireless terminal 100 may be displayed a home screen on which related applications, which are available through connection of the media player 300*c*, are arranged according to their priorities.

When the media player 300*c* is connected to the wireless terminal 100, an environment of the wireless terminal 100 is reset (external indications or operation) according to the coupled media player 300*c*. For example, a manner mode may be switched to a ring mode, a volume may be increased to a predetermined value or more, or a small-capacity battery may be activated for use. A type of the environmental reset in the wireless terminal 100 may be changed by user's selection.

While related applications are displayed in the wireless terminal when an external accessory such as a vehicle cradle, a keyboard, or a media player is connected to the wireless terminal in FIGS. 3A through 3C, the above-described operation of the present invention may be performed through any external accessory connectable to the wireless terminal, such as medical instrument, an exercise machine, etc.

As can be seen from the foregoing description, according to the method and device for providing a related application for an external accessory in a wireless terminal, only a related application for an external accessory connected to the wireless terminal is automatically displayed, thereby facilitating the use of the related application for the external accessory.

While a detailed exemplary embodiment such as a wireless terminal has been described in the present invention, various changes may be made without departing from the scope of the present invention. Accordingly, the scope of the present invention should be defined by the claims and equivalents thereof, rather than the described exemplary embodiment.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. An apparatus comprising:
a memory to store first information associated with a first home screen, and second information associated with a second home screen; and
a controller operatively coupled with the memory, the controller configured to:
provide, via a display, the first home screen using the first information including a type of a first external apparatus corresponding to the first home screen and change a setting of the apparatus based on the first information, based at least in part on a determination that the apparatus is operatively coupled with the first external apparatus; and
provide, via the display, the second home screen using the second information including a type of a second external apparatus corresponding to the second home screen and change the setting of the apparatus based on the second information, based at least in part on a determination that the apparatus is operatively coupled with the second external apparatus.

2. The apparatus of claim 1, wherein the first external apparatus comprises a vehicle cradle, and wherein the first home screen comprises one or more applications related to the vehicle cradle.

3. The apparatus of claim 2, wherein the one or more applications comprise at least one of a map application, a traffic application, or a navigation application.

4. The apparatus of claim 1, wherein the second external apparatus comprises an accessory related to media, and wherein the second home screen comprises one or more applications related to the accessory.

5. The apparatus of claim 4, wherein the one or more applications comprise at least one of a broadcasting application, a video application, a music application, an image viewer application, a media streaming service application, or an education application.

6. The apparatus of claim 1, wherein the first external apparatus comprises an input device to obtain a user input, and wherein the first home screen comprises one or more applications related to the input device.

7. The apparatus of claim 6, wherein the one or more applications comprise at least one of a text application, an email application, a document application, a memo application, a message application, or a social network service application.

8. The apparatus of claim 1, wherein at least one of the first external apparatus or the second external apparatus is configured to be operatively coupled with the apparatus via a wireless communication.

9. The apparatus of claim 1, wherein the controller is configured to:
provide, via a corresponding one of the first home screen or the second home screen, one or more applications related to the first external apparatus or the second external apparatus, respectively, based at least in part on use information of the one or more applications.

10. The apparatus of claim 1, wherein the controller is configured to:
provide, via a corresponding one of the first home screen or the second home screen, one or more applications related to the first external apparatus or the second external apparatus, respectively, based at least in part on priorities of the one or more applications.

11. The apparatus of claim 1, wherein the controller is configured to:
provide, via a corresponding one of the first home screen or the second home screen, at least one of an image or a text indicating that the apparatus is operatively coupled with the first external apparatus or the second external apparatus, respectively.

12. The apparatus of claim 1, wherein the controller is configured to:
provide a first application corresponding to the first external apparatus as part of the first home screen; and
provide a second application corresponding to the second external apparatus as part of the second home screen.

13. The apparatus of claim 1, wherein the setting comprises a setting associated with at least one of a ring tone, a volume, a battery, a vibration, or a ring mode.

14. A method comprising:
identifying, at an electronic device operable to provide a plurality of home screens, an external device operatively coupled with the electronic device;
selecting a home screen corresponding to a type of the external device from the plurality of home screens based at least in part on a determination that the home screen is mapped to the external device;
displaying, via a display, the home screen including an image corresponding to an application related to the external device; and
changing a setting of the electronic device based on the type of the external device.

15. The method of claim 14, wherein the home screen is selected further based on a determination that the external device comprises a vehicle cradle, and wherein the application comprises at least one of a map application, a traffic application, or a navigation application.

16. The method of claim 14, wherein the home screen is selected further based on a determination that the external device comprises an accessory operable to play media, and wherein the application comprises at least one of a broadcasting application, a video application, a music application, an image viewer application, a media streaming service application, or an education application.

17. The method of claim 14, wherein the home screen is selected further based on a determination that the external device comprises an input device to obtain a user input, and wherein the application comprises at least one of a text application, an email application, a document application, a memo application, a message application, or a social network service application.

18. The method of claim 17, wherein the setting comprises a setting associated with at least one of a ring tone, a volume, a battery, a vibration, or a ring mode.

19. An apparatus comprising:
memory to store information associated with a plurality of home screens; and
a controller operatively coupled with the memory, the controller configured to:
identify, at an electronic device operable to provide a plurality of home screens, an external device operatively coupled with the electronic device;
select a home screen corresponding to a type of the external device from the plurality of home screens based at least in part on a determination that the home screen is mapped to the external device;
provide the home screen via a display operatively coupled with the electronic device, the providing including providing one or more applications related to the external device; and
change a setting of the electronic device based on the type of the external device.

20. The apparatus of claim 19,
wherein the setting comprises a setting associated with at least one of a ring tone, a volume, a battery, a vibration, or a ring mode.

\* \* \* \* \*

UNITED STATES PATENT AND TRADEMARK OFFICE
CERTIFICATE OF CORRECTION

PATENT NO. : 9,503,565 B2  Page 1 of 1
APPLICATION NO. : 14/279626
DATED : November 22, 2016
INVENTOR(S) : Min-Ji Kim et al.

It is certified that error appears in the above-identified patent and that said Letters Patent is hereby corrected as shown below:

In the Claims

Column 12, Claim 18, Line 1 should read as follows:
--…claim 14, wherein the…--

Signed and Sealed this
Fourteenth Day of February, 2017

Michelle K. Lee
*Director of the United States Patent and Trademark Office*